United States Patent [19]

Goodman

[11] 4,022,318

[45] May 10, 1977

[54] JEWELRY KIT WITH DECORATIVE YARN OR BEADS

[76] Inventor: Morris Goodman, Crown Imperial Jade, Box 629, Freehold, N.J. 07728

[22] Filed: Nov. 3, 1975

[21] Appl. No.: 628,606

[52] U.S. Cl. ................................ 206/223; 206/227; 206/457; 206/1.7

[51] Int. Cl.$^{2}$ ...................... B44D 5/00; G09B 19/00

[58] Field of Search .............. 206/223, 227, 45, 33, 206/1.7, 1.8, 457; 428/28; 63/28

[56] References Cited

UNITED STATES PATENTS

| | | | |
|---|---|---|---|
| 2,080,317 | 5/1937 | Jaeckel | 63/28 |
| 2,789,380 | 4/1957 | Philmus | 428/28 |
| 3,035,689 | 5/1962 | Arnheiter | 206/223 |
| 3,176,836 | 4/1965 | Gunn | 206/45.33 |
| 3,269,032 | 8/1966 | Sumner | 206/223 |
| 3,581,882 | 6/1971 | Bish | 206/1.7 |
| 3,604,558 | 9/1971 | Frerebeau | 206/1.7 |

*Primary Examiner*—William T. Dixson, Jr.
*Attorney, Agent, or Firm*—Clarence O'Brien; Harvey B. Jacobson

[57] ABSTRACT

A jewelry kit for home craftsmen and the like includes preformed art items in the shape of flowers, animals, insects, and the like. Said preshaped art items having grooves or channels formed therein for reception of decorative yarn or beads therein by the home craftsman for completion of the art objects ready for use or sale.

6 Claims, 8 Drawing Figures

JEWELRY KIT WITH DECORATIVE YARN OR BEADS

BACKGROUND OF THE INVENTION

1. Field of the Invention

This invention relates generally to art objects supplied in kit form for completion thereof by a hobby craftsman or other maker-user.

2. Description of the Prior Art

Jewelry items and art items are quite common in the prior art and rings and similar type jewelry having recessed channels or holes therein for reception of stones and other items of art are also known, The known prior art teachings do not provide the simplicity of completion necessary for many home craftsmen, nor do they teach the combination of the required items in kit form for purchase as a complete assembly ready for finishing by the user.

Known prior art rings and other type jewelry items which may be pertinent to this invention are as follows: patents to Gebhardt, U.S. Pat. Nos. 1,280,707; Schill, 532,824; Ogush, 1,501,616; Merle, Jr., 1,578,542; Bernier, 1,855,331; Doherty, 3,255,611; Stenzler, 3,483,716; and Nielsen, 3,805,549. None of these prior art patents teach the new and unique concept as disclosed by this invention.

SUMMARY OF THE INVENTION

An object of the present invention is to provide an art object which may be easily completed by a hobby craftsman.

Another object of this invention is to provide a kit including at least two preformed items of art in the shape of flowers, animals, insects, birds, and the like which have preformed channels therein for ready reception of finishing yarn or beads so that a craftsman may complete the items of art with relative ease and yet achieve a commercial looking product.

A further object of this invention is to provide an item of art for use as decorative jewelry which may be readily completed by one in a manner to satisfy his personal preference. That is the user has a choice of finishing materials to allow his individual expression to be displayed on the art form.

A still further object of this invention is to provide a kit for making jewelry or art objects having at least two different forms of jewelry included therein with necessary decorative yarns and/or beads for completion of said two art objects.

One of the big features of the invention disclosed herein is in the fact that the user of this jewelry kit has a choice of no less than two items of art and/or jewelry for completion in a manner which expresses the individual's personal concept of what is pleasing to the eye.

Another important feature is in the fact that the basic structure of the jewelry or art form is substantially preformed with channels or recesses therein for quick and easy reception of finishing decorative yarn and/or beads therein. Many of the peopele making up the market for this type of item have in truth quite limited construction and creative abilities. They enjoy finishing things and enjoy the self-satisfaction of knowing they have expressed their own personal preferences as to colors, art layout, etc., but their ability to really create an object of art from the very beginning is quite limited. For such types this jewelry kit is ideal. The basic and difficult part of the construction is already provided by the preformed jewelry item supplied with the kit, and all that readily needs to be done is to glue on decorative yarn or decorative beads, or both, in the manner which pleases the craftsman, in order to complete the jewelry item.

Such jewelry kits fill an existing need in the world today and the disclosed invention provides these features in a new and unique manner.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
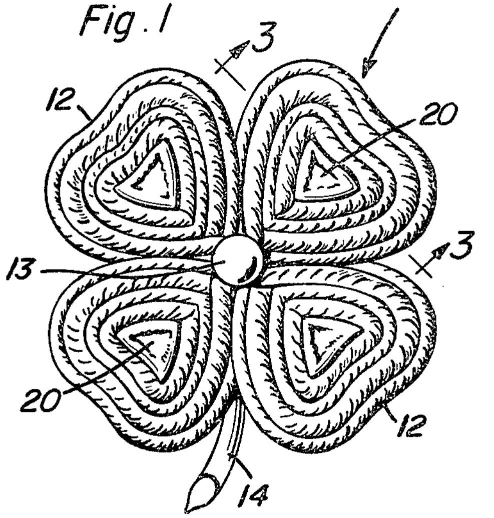
FIG. 1 is a perspective view of one form of a jewelry item as supplied in the kit of this invention.

Referring to FIG. 1 of the drawing, reference numeral 10 indicates a completed piece of decorative jewelry formed from the components as supplied in the kit of this invention. This piece of jewelry is in the shape of a flower having petal portions 12 with a stem 14 and a central decorative metal bead 13. Other metal embossing and projections such as 20 may be preformed in the base object to add further decoration to the over-all device. This preformed object of art, while preferably made of metal, could obviously be also of plastic, fiberboard, or other similar material. However, metal is one of the more easily usable materials and especially in order to mass produce the basic component art forms for supplying the assembler of the kits.

Figure 2:
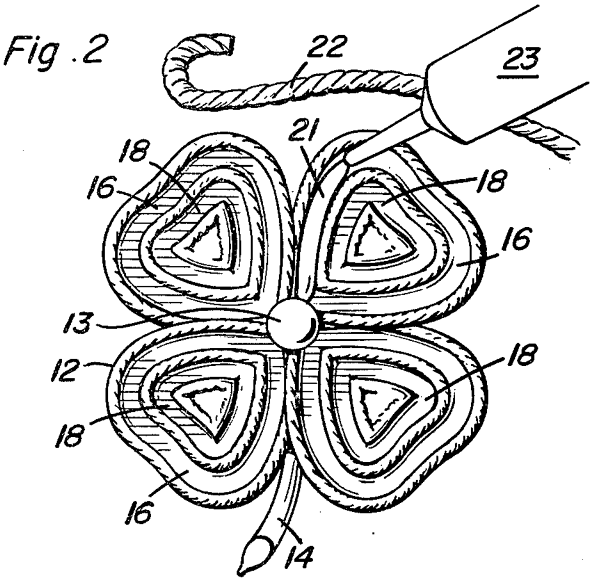
FIG. 2 is another perspective view of the art form of FIG. 1, showing a stage of construction thereof.
Figure 6:
FIG. 6 is a view showing a whole bead usable as decoration on the preformed art objects of the kit of this invention.

The other components supplied with the kit normally would include a decorative yarn such as that shown at 22 in FIG. 2 together with suitable adhesive means as indicated by tube 23. Further decorative items such as flexible strip 46 having half beads 44 firmly attached thereto would normally also be included in the kit and full round decorative beads such as 42 shown in FIG. 6 normally also would be included. All of these decorative items are easily obtainable in stock form and offer great flexibility as to choice of colors, textures, quantities, etc.

Figure 3:
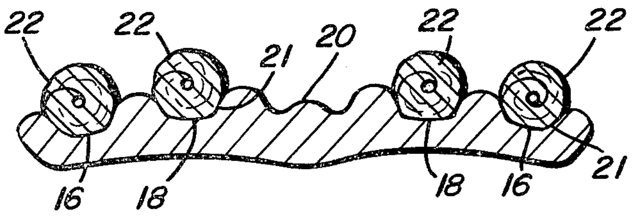
FIG. 3 is an enlarged cross-sectional view taken generally along line 3—3 of FIG. 1.

FIG. 2 shows the flower of FIG. 1 as it is being made. A bead of glue 21 is extruded into the trough-like recesses 16 provided in the preformed art object and then after a short time to allow the glue to begin to set, the decorative yarn 22 is put into the recesses to completely cover them and be retained therein by the side portions of the trough-like recesses and the adhesive means. FIG. 3 shows how the decorative yarn rests in the trough-like recesses 16 and the glue means 21 to retain same in the recesses. The user of the kit may use yarns of different colors and/or textures for the different recess portions in the objects of art form, or use all the same color, etc., whatever pleases the craftsman.

Figure 4:
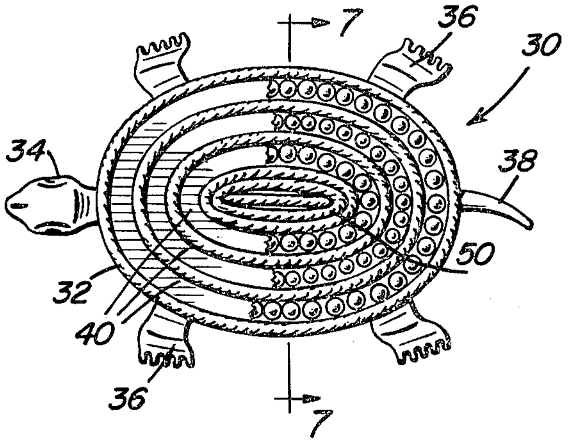
FIG. 4 is a perspective view of another item of jewelry that is intended to be included in the kit of this invention.
Figure 5:
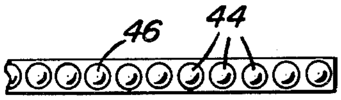
FIG. 5 is a top view of a decorative strip having half beads included thereon.
Figure 7:
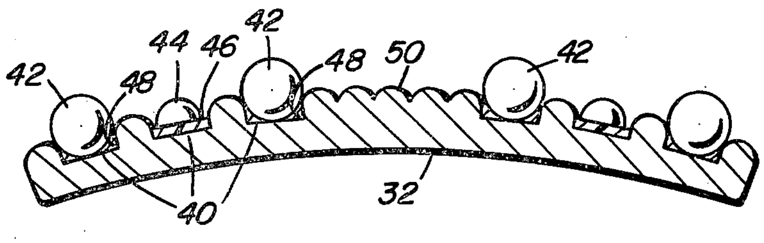
FIG. 7 is an enlarged cross-sectional view taken generally along line 7—7 of FIG. 4.

FIG. 4 shows another art form for a piece of jewelry being in the shape of a small turtle. As can be seen the main body portion 32 has a head 34 extending therefrom as well as legs 36 and a tail portion 38. Again the upper surface of this preformed metal art form has troughs 40 formed therein. Additional decorative embossing or recesses may be provided between or in the center of the troughs such as shown by 50 in FIGS. 4 and 7. The user of the kit will again apply appropriate adhesive to the troughs 40 and then insert decorative yarn, beads, or flexible strip material having decorations thereon into said troughs. FIG. 7, a cross section across the middle of the turtle ornament, shows full beads 42 adhesively retained at 48 in the troughs 40. That is the outermost troughs 40 and the innermost troughs 40. The middle trough 40 has the flexible strip 46 adhesively retained therein which supports the half beads 44 thereon. Of course the decorative yarn 22 of FIG. 2 could just as easily be used instead of one or more rows of the beads/half beads.

Figure 8:
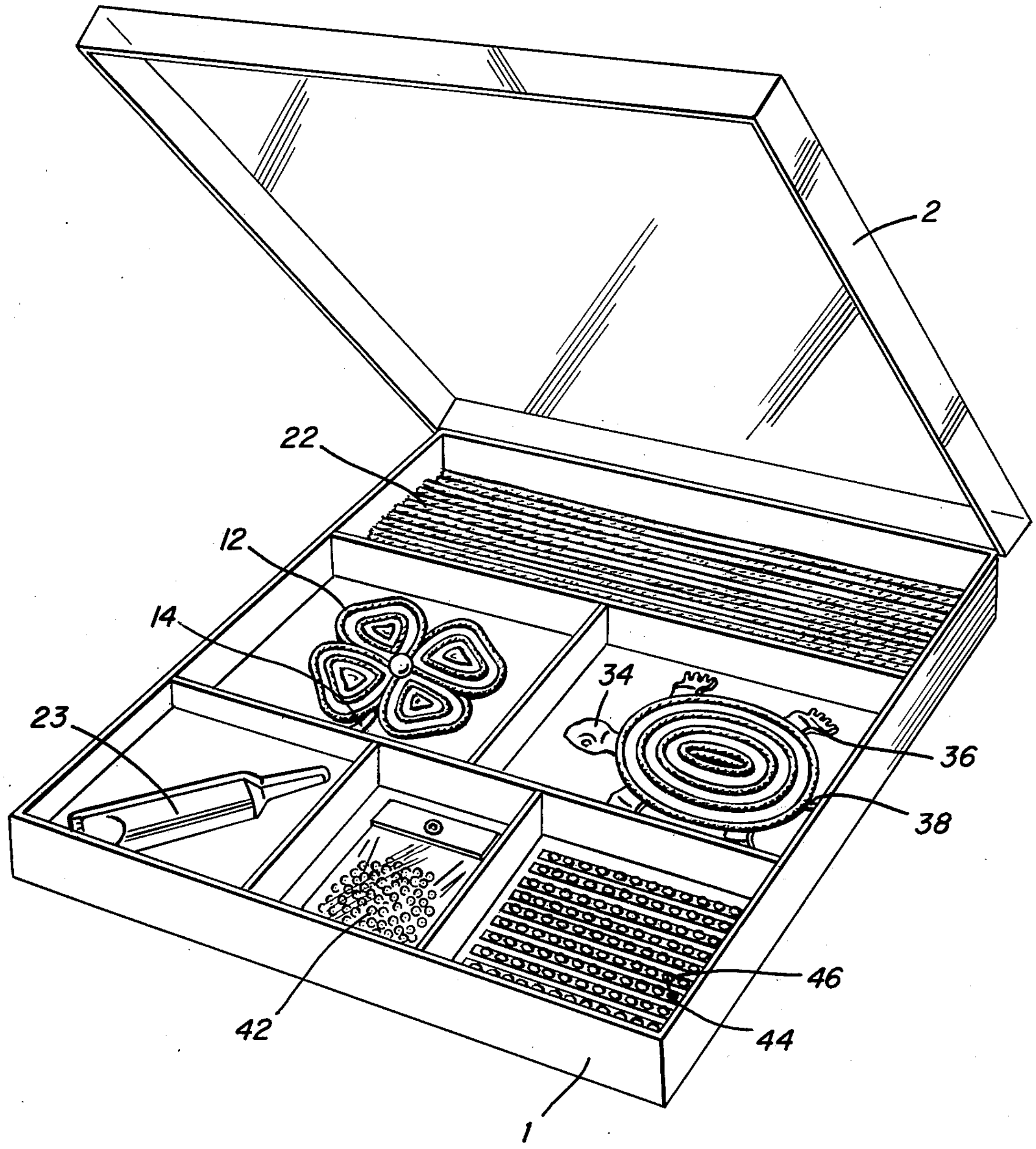
FIG. 8 is a perspective view of the component items of the jewelry kit as supplied in a conventional-type container.

FIG. 8 shows a conventional-type container 1 with a lid 2 for holding the component items of the jewelry kit as described above.

As can be seen the items to be included in this kit eliminate most of the actual difficult parts of the construction of decorative art form and jewelry items, but allow the creative and artistic ability of the home craftsman to come to the fore. This kit is ideal for use by the aged, the young, infirm, arthritic, and handicapped persons, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A decorative jewelry kit comprising: a container at least one preformed metal art form, said art form being shaped to resemble some commonly recognizable object, and said art form having trough-like recesses therein for receiving and retaining decorative material means therein, said material means being included with said kit, the decorative material means comprise decorative yarn of various textures and colors, full round beads, and a flexible strip having half beads fixedly attached thereon.

2. The device of claim 1 wherein the kit includes a tube of adhesive glue.

3. The device of claim 2 wherein the art form in the kit is in the shape of a flower.

4. The device of claim 3 wherein the flower shaped art form has four petals and a stem portion, with each of the petals having at least two of the trough-like recesses for receiving and retaining the decorative material herein.

5. The device of claim 2 wherein the art form in the kit is in the shape of a turtle.

6. The device of claim 5 wherein the turtle shaped art form has a body portion with a head, tail, and four feet extending from the body portion, and the body portion having at least two of the trough-like recesses for receiving and retaining the decorative material therein.

* * * * *